United States Patent [19]
Gregoric

[11] 3,811,704
[45] May 21, 1974

[54] SELF-PROPELLED HYDRAULICALLY DRIVEN VEHICLE

[76] Inventor: Bran F. Gregoric, 4685 Central Blvd., Ann Arbor, Mich. 48104

[22] Filed: Oct. 12, 1972

[21] Appl. No.: 296,871

[52] U.S. Cl............................... 280/216, 280/293
[51] Int. Cl............................................ B62m 3/00
[58] Field of Search...... 280/216, 293, 301; 180/30, 180/33 R, 66 R

[56] References Cited
UNITED STATES PATENTS

| | | | |
|---|---|---|---|
| 576,538 | 2/1897 | Bellamy | 280/216 |
| 713,350 | 11/1902 | Schmidt | 280/216 |
| 2,177,381 | 10/1939 | Bichi | 280/216 |
| 2,561,268 | 7/1951 | Dyksma | 280/301 |

*Primary Examiner*—Richard A. Schacher
*Attorney, Agent, or Firm*—Olsen and Stephenson

[57] ABSTRACT

A self-propelled bicycle-type vehicle comprising a frame, front and rear wheels supporting the frame, a foot pedal actuated pump on the frame operable to provide fluid under pressure and a torque producing mechanism associated with the bicycle drive wheel and driven by fluid from the pump. The vehicle also has two auxiliary side wheels which are movable between retracted and ground engaging positions. The side wheels engage the ground so as to prevent the vehicle from tipping over when the vehicle is at rest or is moving slowly. A pump actuated lift system on the frame retracts the wheels when the vehicle has achieved a predetermined speed.

3 Claims, 6 Drawing Figures

PATENTED MAY 21 1974 3,811,704

SELF-PROPELLED HYDRAULICALLY DRIVEN VEHICLE

BACKGROUND OF THE INVENTION

Foot pedal driven bicycles are becoming more and more widely used because of their exercise value and their ecological advantage over motor driven vehicles. Conventional pedal operated bicycles are mechanically operated. Usually, a sprocket and chain assembly connects the pedals to the rear drive wheel so that pedal movement will result in the application of torque to the drive wheel. However, the principal drawback to wider use of bicycles of this type is the large amount of human energy required in moving the bicycles over a long distance. The principal object of the present invention, therefore, is to provide a bicycle-type vehicle in which the manual forces on the pedals are used to drive a hydraulic pump. The pump then provides the necessary power for smoothly driving the vehicle.

SUMMARY OF THE INVENTION

The vehicle of this invention consists of the usual frame having handle bars and a seat and on which front and rear wheels are rotatably mounted. A pedal driven pump is mounted on the frame and a drive mechanism responsive to fluid pressure from the pump is mounted on the rear wheel. As a result, pedal movement is utilized to provide fluid under pressure which is in turn utilized to drive the rear wheel. Since the fluid drive mechanism is subject to damage in the event the vehicle falls on its side, a pair of retractable side wheels are mounted on the frame to prevent the vehicle from falling on its side at any time. A hydraulic lift mechanism driven by the pedal operated pump is operable to lift the side wheels off the ground when the vehicle has achieved a predetermined forward speed sufficiently high to prevent the vehicle from falling on its side. As the vehicle slows down, the lift mechanism returns the side wheels to their ground supported positions in which they prevent the vehicle from falling on its side.

Thus, the vehicle of this invention provides a bicycle which is easy to operate in a smoothly driven manner over prolonged distances.

Further objects, features and advantages of this invention will become apparent from a consideration of the following description, the appended claims, and the accompanying drawing in which:

Figure 1:
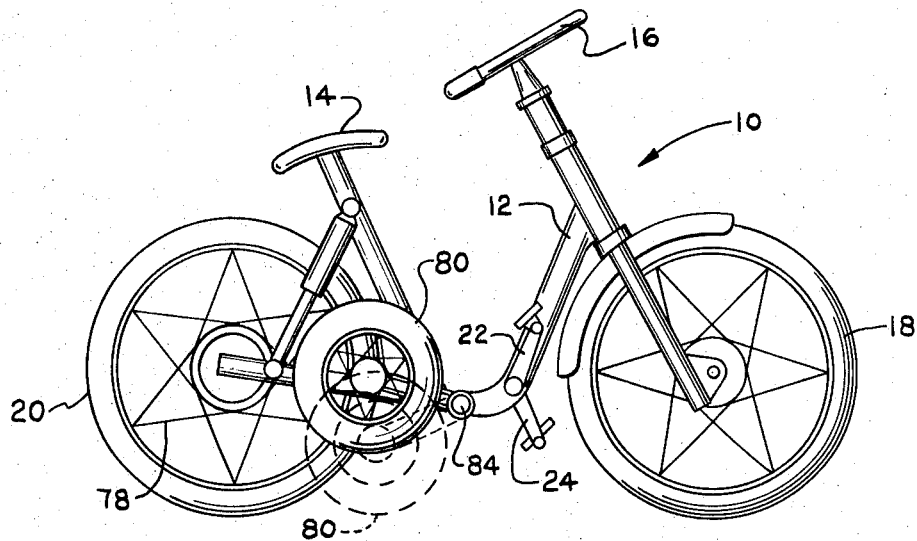
FIG. 1 is a side elevational view of the vehicle of this invention showing the auxiliary side wheels in retracted positions in full lines and in ground supported position in broken lines.
Figure 2:
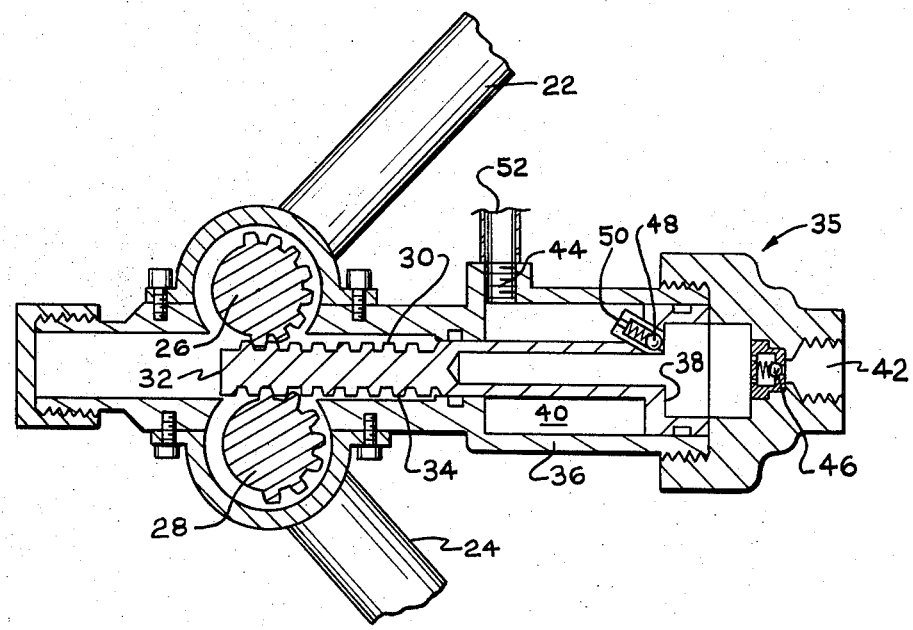
FIG. 2 is a fragmentary sectional view of the pump in the vehicle of this invention.

With reference to the drawing, the self-propelled vehicle of this invention, indicated generally at 10, is illustrated in FIG. 1 as consisting of a frame 12 having a bicycle-type seat 14 and handle bars 16. A front wheel 18 and a rear wheel 20 are rotatably mounted on the frame 12. A pair of pedal supporting arms 22 and 24 are rotatably journaled at their inner ends on the frame 12. As shown in FIG. 2, the arm 22 is connected at its inner end to a gear member 26 and the arm 24 is similarly connected at its inner end to a gear 28. The gear 26 meshes with teeth 30 on one side of a rack 32 and the gear 28 meshes with teeth 34 on the opposite side of the rack 32. The rack 32 is disposed within the housing 36 for a pump 35 in which a hollow piston 38 is slidably mounted. The piston 38 is connected to the rack 32 and is driven to its forward position shown in FIG. 2 in response to movement of the pedal arm 24 from an upwardly and forwardly inclined position to the downwardly and forwardly inclined position shown in FIG. 2. The piston is movable rearwardly to a rear position by moving the pedal arm 22 from its upwardly and forwardly inclined position shown in FIG. 2 to a downwardly and forwardly inclined position like the position shown for the arm 24 in FIG. 2. The housing 36 contains a fluid chamber 40 in which the piston 38 moves and which has an inlet 42 and an outlet 44. A one way check valve 46 controls the inlet 42. A similar one way check valve 48 controls an opening 50 formed in the hollow piston 38.

In the operation of the pump 35, as the piston 38 moves to the left as viewed in FIG. 2 in response to downward movement of the pedal arm 22, fluid in the chamber 40 is forced by the piston 38 through the outlet 44 into a conduit 52. During such movement of the piston 38, fluid from the inlet 42 flows into the chamber 40 but is prevented from flowing to the outlet 44 by the valve 48.

During movement of the piston 38 to the right, as shown in FIG. 2, in response to downward movement of the pedal arm 24, the valve 46 is kept closed by fluid pressure in the chamber 40 and the same pressure unseats the check valve 48 so that fluid can flow to the outlet 44. Thus, a continuous supply of fluid under pressure through the conduit 52 is provided in response to alternate up and down movement of the pedal arms 22 and 24.

Figure 3:
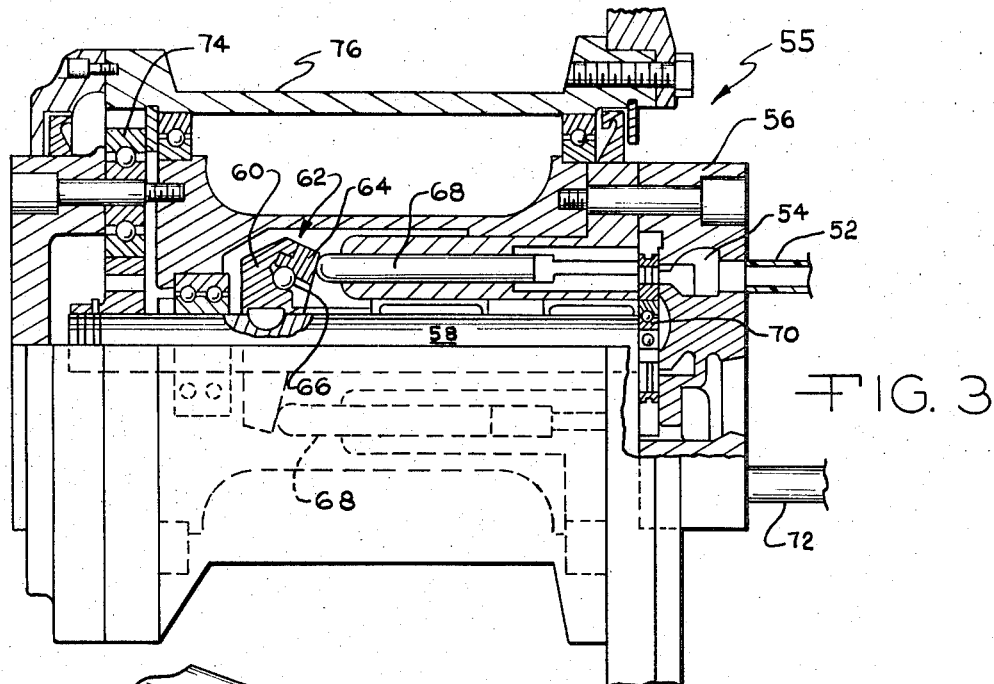
FIG. 3 is a view partly in section of the drive mechanism for the rear wheel in the vehicle of this invention.

The conduit 52 communicates with an inlet passage 54 (FIG. 3) in a hub assembly 56 which forms part of a drive mechanism 55 for the rear wheel 20. The hub assembly 56 is mounted in a stationary position on the frame 12. A drive shaft 58 is journaled on the hub assembly 56 and is connected to one section 60 of a wobble plate assembly 62 which has another section 64 with the two sections 60 and 64 being mounted for relative rotation on balls 66. Fluid actuated pistons 68 are mounted in the assembly 56 and are engageable with the wobble plate section 64 so as to convert movement of the pistons 68 into rotation of the drive shaft 58. Fluid from the inlet 54 actuates the pistons 68 in sequence, by virtue of a porting mechanism 70 so as to achieve relative movement of the wobble plate sections 60 and 64 and drive the drive shaft 58. The structure for converting fluid pressure into rotation of the drive shaft 58 is conventional structure and by itself forms no part of the present invention. Fluid flows out of the hub assembly 56 through an outlet conduit 72 that communicates with the usual reservoir (not shown) which in turn connects with the pump inlet port 42.

The drive shaft 58 acts, through a one way clutch 74 on the hub assembly 56, to drive the rear wheel rim 76 which is connected to the wheel 20 by spokes 78. It can thus be seen that the pump 29 is operable to produce fluid under pressure in response to movement of the pedal arms 22 and 24 and this fluid under pressure is utilized by the drive mechanism 55 to drivingly rotate the rear wheel 20. The faster the pedal arms are moved, the higher the fluid pressure generated by the pump 29 and in turn the faster the pistons 68 are moved to effect faster rotation of the wheel 20. Movement of the pedal arms 22 and 24 is an up and down arcuate movement which is sufficiently close to conventional bicycle pedal movement to enable a rider of a conventional bicycle to readily operate the vehicle 10 of this invention.

Figure 4:
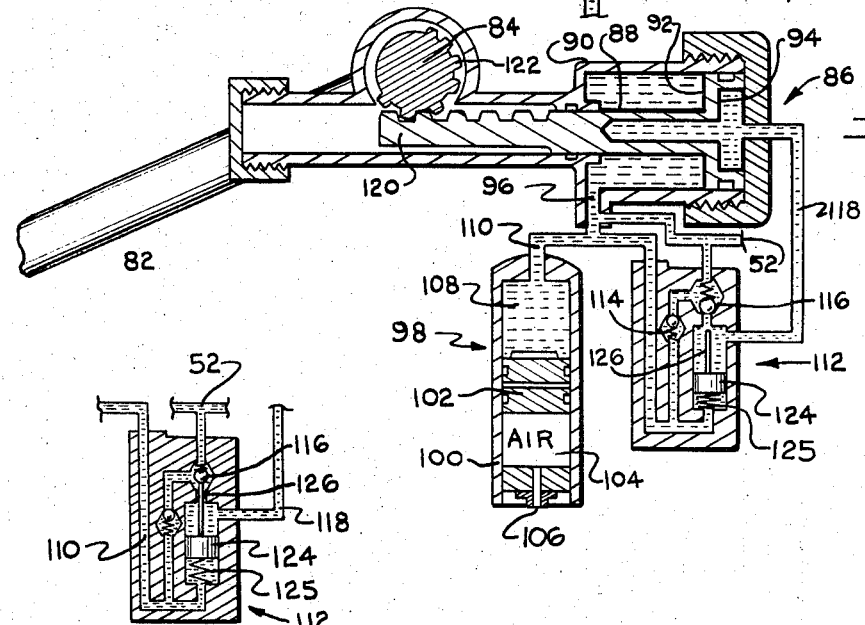
FIG. 4 is a diagrammatic view of the lift system in the vehicle of this invention showing the system in a condition corresponding to a ground supported position of the side wheels.

A pair of auxiliary side wheels 80, only one of which appears in FIG. 1, are provided on opposite sides of the frame 12. The wheels 80 are supported on the outer ends of arms 82 secured at their inner ends to a shaft 84 which is rotatably journaled on the frame 12. The wheels 80 are movable in an arc extending about the shaft 84 between the ground supported and retracted positions shown in broken and solid lines, respectively, in FIG. 1. A hydraulic lift system 86 (FIG. 4) is provided for moving the wheels 80 upwardly to the retracted position. As shown in FIG. 4, the system 86 consists of a hollow piston 88 mounted in a housing 90 and having an outer side 92 and an inner side 94. The housing 90 has a fluid inlet 96 which communicates with the inlet line 52 and also communicates with an accumulator 98.

The accumulator 98 consists of a housing 100 in which a piston 102 is slidably mounted. An air chamber 104 having a check valve inlet 106 is formed on one side of the piston 102. A fluid chamber 108 which communicates with the inlet line 52 is formed on the opposite side of the piston 102. A conduit 110 connects the accumulator 98 with a control valve unit 112 having check valves 114 and 116 therein. The valve unit 112 is connected to the housing 90 on the side 94 of the piston 88 by a conduit 118.

As shown in FIG. 4, when the fluid pressure in the line 52 is below a preset pressure, the existence of fluid under pressure on the side 92 of the piston 88 keeps the piston 88 firmly in a position at the right hand end of the housing 90 as viewed in FIG. 4. A rack 120, formed integral with the piston 88 and meshing with teeth 122 formed on the shaft 84, maintains the arms 82 in positions in which the wheels 80 are in ground supported positions. Thus, the fluid in the housing 90 provides somewhat of a hydraulic cushion which resiliently maintains the wheels 80 on the ground surface when the vehicle 10 is at rest or when the vehicle 10 is moving at a slow rate of speed in which the pressure in the line 52 is below the preset pressure.

Figure 6:
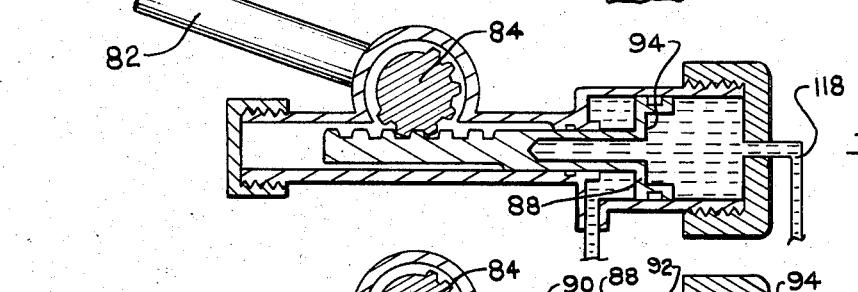
FIGS. 5 and 6 are fragmentary views of portions of the system shown in FIG. 4 illustrating these portions in conditions corresponding to a retracted position of the side wheels.
Figure 5:
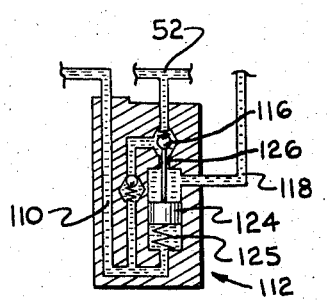

Now assume the pedal arms 22 and 24 have been foot actuated with a requisite force and frequency to increase the pressure in the line 52 and advance the speed of the vehicle 10 above the preset speed. The accumulator 98 will provide for a continuous increase in the pressure in the line 110 as the pressure in the line 52 increases. This pressure in the line 110 will eventually lift a piston 124, urged by a spring 125, in the valve unit 112 to a position in which a stem 126 thereon unseats the valve 116 (FIG. 5) thereby allowing pressure from the line 52 to travel through the line 118 to the side 94 of the piston 88. Since the area on the side 94 is greater than the side 92, the piston will then move to the left to the position shown in FIG. 6. During such movement of the piston 88, the shaft 84 will be rotated in a clockwise direction as viewed in FIGS. 4 and 6, by the rack 120 to in turn move the arms 82 upwardly to retract the wheels 80. The wheels 80 will then be maintained in their retracted positions by fluid pressure in the line 52 so long as the vehicle 10 is moving at a speed higher than the preset speed. When the speed of the vehicle 10 falls below the preset speed, the pressure in the line 110 will decrease and the valve 116 will be closed. When this happens, fluid will quickly build up in the housing 90 on the side 92 of the piston 88 and will cause the piston 88 to return to its position shown in FIG. 4. During such return fluid on the side 94 of the piston 88 will leak past the valve 116.

From the above description it is seen that this invention provides an improved bicycle-type vehicle which is fluid driven by a foot pedal actuated pump. In addition, the vehicle is provided with auxiliary side wheels 80 which enable use of the vehicle at very slow speeds without danger of the vehicle tipping over.

What is claimed is:

1. A self-propelled vehicle comprising a frame, wheels supporting said frame, manually actuated pump means on the frame operable to provide fluid under pressure, said pump means comprising a piston, a rack secured to said piston, gear members meshing with opposite sides of said rack so that clockwise rotation of said one gear member drives said piston member in one direction and clockwise rotation of the other gear member drives said piston member in the opposite direction, pedal members connected to said gear members, each of said pedal members being movable from an upwardly and forwardly inclined position to a downwardly and forwardly inclined position during rotation of the gear member connected thereto to drive said piston member, and means responsive to said fluid under pressure operable to apply a torque to one of said wheels.

2. A self-propelled vehicle comprising a frame, front and rear wheels supporting said frame, a pair of auxiliary side wheels pivotally mounted on said frame for movement between retracted and ground engaging positions, said side wheels in said retracted position being above the ground when said front and rear wheels are ground supported, manually actuated pump means on the frame operable to provide fluid under pressure, means responsive to said fluid under pressure operable to apply a torque to one of said front and rear wheels, a hydraulic lift system on said frame connected to said pump means and operable to move said side wheels between said ground engaging and retracted positions, and means in said lift system operable to provide for retraction of said side wheels in response to supply of fluid from said pump above a predetermined pressure.

3. A vehicle according to claim 2 wherein said means in said system providing for retraction of said side wheels in response to a predetermined pressure includes a fluid actuated piston operable when moved by fluid pressure on one side thereof to retract said wheels, a compressed air chamber, piston means in said chamber, fluid conduit means connecting said chamber and said pump means so that as pressure from said pump means increases the air pressure in said chamber is increased and means responsive to a predetermined air pressure for directing fluid to said one side of said piston means.

* * * * *